United States Patent
Yamashita et al.

[11] 3,792,277
[45] Feb. 12, 1974

[54] APPARATUS FOR INDIVIDUALLY MEASURING A PLURALITY OF DOSIMETER ELEMENTS FIXED IN A SINGLE FRAME

[75] Inventors: Tadaoki Yamashita; Osamu Yamamoto, both of Hirakata; Hajimu Oonishi, Neyagawa; Hidetsugu Kawabata, Kobe; Saburo Kitamura, Kyoto, all of Japan

[73] Assignee: Matsushita Electric Industrial Co., Ltd., Osaka, Japan

[22] Filed: Oct. 13, 1971

[21] Appl. No.: 188,802

Related U.S. Application Data
[63] Continuation-in-part of Ser. No. 26,676, April 8, 1970, abandoned.

[30] Foreign Application Priority Data
Aug. 9, 1971 Japan.............................. 46-60428

[52] U.S. Cl.............................................. 250/369
[51] Int. Cl................................................. G01t 1/11
[58] Field of Search .................... 250/71 R, 83 CD

[56] References Cited
UNITED STATES PATENTS
3,590,245  6/1971  Oonishi et al..................... 250/71 R
3,484,605  12/1969  Attix .............................. 250/71 R

*Primary Examiner*—Archie R. Borchelt
*Assistant Examiner*—Davis L. Willis
*Attorney, Agent, or Firm*—Stevens, Davis, Miller & Mosher

[57] ABSTRACT

A thermoluminescence dosimetry system in which a composite thermoluminescence dosimeter having a plurality of thermoluminescent elements fixed in a single frame and a thermoluminescence readout instrument are combined to efficiently, simply and reliably analyze the doses of radiant rays.

1 Claim, 4 Drawing Figures

APPARATUS FOR INDIVIDUALLY MEASURING A PLURALITY OF DOSIMETER ELEMENTS FIXED IN A SINGLE FRAME

This application is a Continuation - in - Part of the U.S. Ser. No. 26676 filed on Apr. 8, 1970 and now abandoned.

This invention relates to a thermoluminescence dosimetry system in which a composite thermoluminescence dosimeter having a plurality of thermoluminescent elements fixed in a single frame is combined with a thermoluminescence readout instrument, whereby the analysis of the doses of radiant rays is simplified and rendered reliable.

Thermoluminescence dosimeters have been widely used in recent years for the measurement of cumulative doses of radiant rays but usually the radiation sensitive elements (thermoluminescent elements) thereof are used one at a time and the measurement of the amounts of the radiant rays to which the individual radiation sensitive elements have been exposed is also effected one element after another.

However, the radiant rays include various types of doses and in order to measure $\gamma$-rays and neutron beams in a radiant ray separately or to evaluate the energy of $\gamma$-rays, it becomes necessary to use two or more thermoluminescent elements having different characteristics. Therefore, there has been employed a method in which a plurality of thermoluminescent elements are accommodated in one case and taken out therefrom one after another for measurement.

In this method, however, the handling of the elements is inconvenient because they are individually taken out from the case, and moreover the measurement of the doses on the individual elements by mounting said elements one after another in a readout instrument results in a lowering of the measuring accuracy. For these reasons, it has been desired to provide these elements in the form of a composite dosimeter so that the individual elements may be measured as being mounted in the composite dosimeter. In the thermoluminescence dosimeters, the thermoluminescent element exposed to radiant rays is heated to about 400°C. and the resulting thermoluminescence is measured to determine the amount of the radiant rays. In case of the composite thermoluminescence dosimeter, however, various problems have been encountered in heating the dosimeter which are difficult to solve. In order to obviate such problems, Attix et. al. proposed to arrange thermoluminescent elements on one heat conducting substrate and to heat said substrate, whereby the individual elements are heated by the heat conducted thereto from the substrate. However, according to this method it is difficult to heat the elements independently of each other and all of the elements are heated concurrently. Additionally, a plurality of readout instruments are required for the measurement of the thermoluminant rays generated by the heated elements, which have rendered the operation cumbersome and impaired the measuring accuracy. In this prior art method, attempt has been made to heat the respective elements with a certain time delay but such an attempt has also been unsatisfactory in that the elements which are not desired to be heated are also heated to some extent, causing an error in the measurement.

The present invention has for its object the provision of a thermoluminescence dosimetry system in which a composite thermoluminescence dosimeter having a plurality of thermoluminescent element is combined with heating means in such a manner that said elements may be heated independently of each other, and which therefore obviates the above-described drawbacks of the conventional thermoluminescence dosimeters.

According to the present invention there is provided a thermoluminescence dosimetry system comprising a composite thermoluminescence dosimeter having a plurality of thermoluminescent elements fixed in a frame consisting of a flat plate each in such a manner that a minimum amount of heat is conducted from said frame to said element, means for heating each of said elements in a heating position by blowing a blast of heated air thereagainst, means for receiving the thermoluminescence generating from said heated element and means for shifting said composite thermoluminescence dosimeter to bring said elements into said heating position one after another.

Now, the thermoluminescence dosimetry system according to the invention will be described in greater detail with reference to the accompanying drawings.

Figure 1:
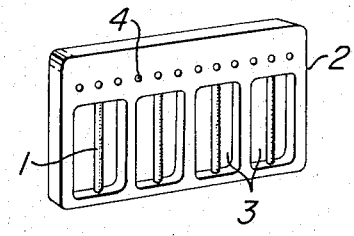
FIGS. 1 and 2 are perspective views showing different types of the composite thermoluminescence dosimeter used in the present invention.

Referring first to FIG. 1 there is shown a type of the composite thermoluminescence dosimeter used in the present invention. Reference numeral 1 designates a thermoluminescent element consisting of a thermoluminescent material disposed in a glass tube sealed at the opposite ends thereof, and 2 designates a frame made of a metal or a heat-resistant resin material and having openings 3 formed therein. Each of the thermoluminescent elements 1 is disposed in each of the opening 3 formed in the frame 2 and secured to said frame 2 at the opposite ends thereof, with the major portion thereof spaced from the side walls of said opening 3, so that when a blast of heated air is blown against the element, said element only may be heated and the frame may not be heated, and the heat of the frame may not transfer to said element. Since the major portion of each thermoluminescent element is spaced from the body of the frame, the thermoluminescent element can be uniformly effectively heated by a blast of heated air from the entire peripheral surface thereof. Such a construction is extremely important for heating the thermoluminescent element by means of a blast of heated air.

Figure 2:
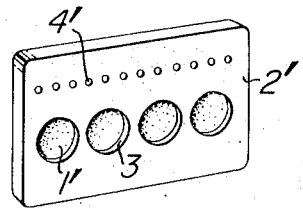

Referring to FIG. 2 there is shown another type of the composite thermoluminescence dosimeter. Reference numeral 1' designates a thermoluminescent element consisting of a powdered thermoluminescent material molded into a thin sheet using a heat-resistant resin as binder, and 2' designates a frame made of a metal or a heat-resistant resin material and having circular holes 3' formed therein. Each of the thermoluminescent elements 1' is securely disposed in each of the circular holes 3', with the peripheral edge thereof clamped by said frame. The thermoluminescent element 1' is so thin that little amount of heat transfers from the frame to the thermoluminescent element. For the same reason, the heat capacity of the thermoluminescent element 1' is small, so that when a blast of heated air is blown for heating the element, said element is heated quickly but the frame 2' is not substantially heated.

In FIGS. 1 and 2, reference numerals 4, 4' designate apertures formed in the frames of the respective composite thermoluminescence dosimeters, in which the identification numbers of the respective thermoluminescent elements are indicated. These identification numbers are optically readout by a readout instrument.

Figure 3:
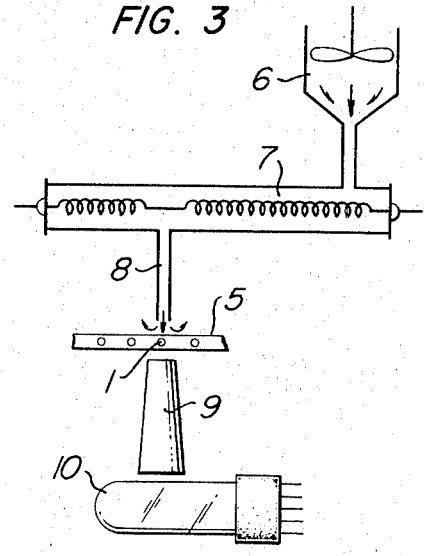
FIG. 3 is a diagrammatical view exemplifying the thermoluminescence dosimetry system according to the invention.

An embodiment of the thermoluminescence dosimetry system according to the invention is diagrammatically shown in FIG. 3. In FIG. 3, reference numeral 5 designates the composite thermoluminescence dosimeter of the type shown in FIG. 1, which has four thermoluminescent elements mounted therein. Reference numeral 1 designates one of the four thermoluminescent elements located in a heating and measuring position. Reference numeral 6 designates a fan or pump for blowing air and 7 designates a heater. The air blown by the fan 6 is heated during passage through the heater 7 and blown against the thermoluminescent element 1 through a nozzle 8. The thermoluminescent element 1, when heated by a blast of heated air, generates thermoluminescence, which is collected by a light pipe 9 and received by a photomultiplier 10. Upon completion of the heating and measurement of the thermoluminescent element 1, the composite thermoluminescence dosimeter is shifted a distance equal to one pitch of the thermoluminescent elements and the next thermoluminescent element is located in the heating and measuring position, and heated and measured in the same manner as described above. In the manner described above, all of the four thermoluminescent elements are measured one after another individually and thus the measurement of the composite thermoluminescence dosimeter is completed.

Figure 4:
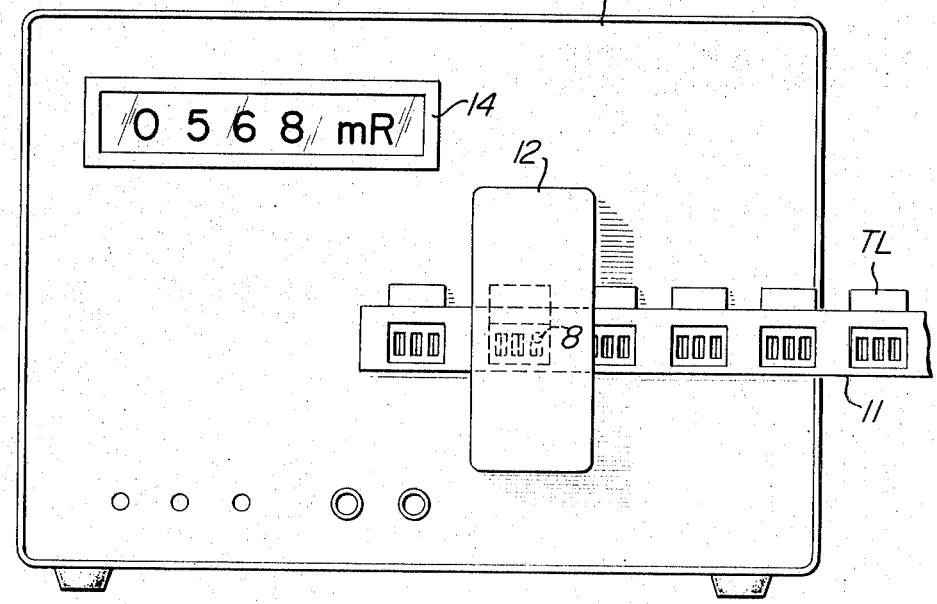
FIG. 4 is a front elevational view of the thermoluminescence dosimetry system shown in FIG. 3.

FIG. 4 is a front elevational view showing the appearance of the thermoluminescence dosimetry system of the type shown in FIG. 3. In FIG. 4, reference numeral 1 designates the composite thermoluminescence dosimeter and 11 designates a slider for shifting the thermoluminescence dosimeters. The thermoluminescence dosimeters mounted in the slider are automatically shifted by said slider. Reference numeral 12 generally designates the heating and measuring portion where the fan, the heater and the photomultiplier are provided. Reference numeral 8 designates the heated air blowing nozzle and the thermoluminescent element to be measured is set in this position. Reference numeral 13 designates a casing of the dosimetry system and 14 designates an indicator tube for indicating the measured photocurrent in terms of dose (roentgen unit).

As described above, according to the present invention there is provided a thermoluminescence dosimetry system in which a plurality of thermoluminescent elements in a composite thermoluminescence dosimeter are heated and measured independently of each other. By using the thermoluminescence dosimetry system of the invention, it is possible to evaluate the cumulative doses of radiant rays on the respective elements in a simple and straightened manner in a composite radiation field. Further, since the thermoluminescent elements in the complex thermoluminescence dosimeter are heated individually and independently of each other, each element can be heated positively and an error resulting from the manner of heating can be minimized. Namely, since the heat of one element does not transfer to the adjacent element during the measurement of said one element, the adjacent element is not subjected to a thermal influence and accurately maintain the signal thereon.

What is claimed is:

1. A thermoluminescence dosimetry system comprising a composite thermoluminescence dosimeter having a plurality of thermoluminescent elements fixed in a single frame consisting of a flat plate, each element being attached in a line to the frame in a thermally independent state from one another, means for heating each of said thermoluminescent elements one at a time by blowing a blast of heated air thereagainst, a readout instrument for measuring the thermoluminescence generating from said heated element and means for shifting said composite thermoluminescence dosimeter to bring said thermoluminescent elements into a heating position one after another.

* * * * *